United States Patent [19]
Keller

[11] Patent Number: 5,647,510
[45] Date of Patent: Jul. 15, 1997

[54] MULTIPLE COMPONENT METERING AND RELATIVE PROPORTIONING DEVICE WITH COLLAPSIBLE CARTRIDGE

[76] Inventor: Wilhelm A. Keller, Obstgartenweg 9, 6402 Merlischachen, Switzerland

[21] Appl. No.: 411,617

[22] PCT Filed: Aug. 19, 1994

[86] PCT No.: PCT/IB94/00254

§ 371 Date: Apr. 19, 1995

§ 102(e) Date: Apr. 19, 1995

[87] PCT Pub. No.: WO95/05984

PCT Pub. Date: Mar. 2, 1995

[30] Foreign Application Priority Data

Aug. 20, 1993 [CH] Switzerland ............... 02494/93

[51] Int. Cl.⁶ .................................................. B65D 35/22
[52] U.S. Cl. .................... 222/94; 222/95; 222/105; 222/136; 222/389
[58] Field of Search ................. 222/94, 95, 105, 222/145.5, 145.6, 137, 136, 386, 386.5, 389, 326, 570, 327

[56] References Cited

U.S. PATENT DOCUMENTS

| | | | |
|---|---|---|---|
| 2,671,579 | 3/1954 | Knoblock . | |
| 4,340,154 | 7/1982 | Van Manen | 222/136 |
| 4,690,306 | 9/1987 | Staheli | 222/389 |
| 4,760,937 | 8/1988 | Evezich | 222/95 |
| 4,801,046 | 1/1989 | Miczka | 222/136 |
| 5,332,122 | 7/1994 | Herold et al. | 222/386 |
| 5,386,928 | 2/1995 | Blette | 222/94 |

FOREIGN PATENT DOCUMENTS

| | | |
|---|---|---|
| 0124852 | 11/1984 | European Pat. Off. . |
| 0541972 | 5/1993 | European Pat. Off. . |
| 1418581 | 10/1965 | France .................. 222/136 |
| 2501080 | 9/1982 | France . |
| 2650252 | 2/1991 | France . |
| 1927348 | 12/1970 | Germany . |
| 475886 | 9/1969 | Switzerland . |
| WO9107333 | 5/1991 | WIPO . |

*Primary Examiner*—Philippe Derakshani
*Attorney, Agent, or Firm*—Richard Linn

[57] ABSTRACT

The multiple component metering and relative proportioning device, in particular a two-component co-axial device, comprises a cartridge (1) wherein at least one inner package assembly (3) containing one component is lodged within an outer package assembly (2) containing another component. The package assemblies (2, 3) are collapsible and are located in a reusable rigid housing (4), each package assembly having an individual outlet (8, 11), all individual outlets being joined in a common outlet piece (10). The package assemblies are sealed at their other end where a re-usable piston (23) is slidingly lodged within the rigid housing for collapsing the package assemblies and dispensing their content. Such a device allows an efficient disposal of the collapsed package assemblies and of the front outlet piece, and rear pieces in a compact form, whereas the other parts are re-usable, thus maintaining a high reliability, user friendliness and cost effectiveness of the device.

25 Claims, 6 Drawing Sheets

MULTIPLE COMPONENT METERING AND RELATIVE PROPORTIONING DEVICE WITH COLLAPSIBLE CARTRIDGE

FIELD OF THE INVENTION

The present invention is related to a multiple component metering and relative proportioning device, comprising a collapsible cartridge, wherein at least one collapsible receptacle containing one component is located within or adjacent a second collapsible receptacle containing another component.

The now well established field of the use of two and more reactive chemical components which must be separately metered and proportioned at predetermined relative ratios and then mixed together has required the development of corresponding devices. Such chemical systems, including epoxide, polyisocyanates, silicone and polyester resins at the one hand and their hardeners or catalysts, on the other hand, are widely used as adhesives, sealants, coatings, molding materials, insulating foams, etc.

BACKGROUND OF THE INVENTION

Several forms of two component devices exist, comprising more than one receptacle, the most common of which is the side-by-side device. Such cartridges cause a disposal problem as they are rigid and bulky, and there is a substantial waste of plastics material.

There is a still increasing need for packaging, dispensing and applying such systems in an environmentally most friendly manner, as well as for the most reliable, efficient and cost effective way. Attempts have been made to use foil laminates as packaging media for single or two-component liquids. These packages will collapse inside a cylinder during dispensing and are compressed to a minimum size.

One example of it is disclosed in the WO-91/07333 which shows also two-component coaxially arranged bag cartridges with separate outlets united in one outlet. However no means for dispensing the content of the bags are disclosed. The EP-A-0 541 972 discloses a container with two side-by-side arranged sausage-type foil bags each having an outlet ending in one common outlet. The contents are pressed out by two pistons, each piston acting upon a ring.

However, until now, such cartridges have failed to gain much importance because their operation is unreliable, not user friendly, and the cartridge contents contaminate the device when replacing as well as making it messy for the operator.

Based on this prior art, it is an object of this invention to provide a multiple component, in particular a two-component metering and proportioning device which substantially reduces the problem regarding the disposal of the used cartridges and which allows a reliable, efficient and cost effective operation without contamination of user, and re-usable cartridge and dispensing equipment.

SUMMARY OF THE INVENTION

This objective and still others which will become apparent from the following description is attained by a device as described above wherein the receptacles are package assemblies which are collapsible and located in a housing, each package assembly having an individual outlet at one end, all individual outlets being joined in a common outlet piece, said package assemblies being sealed at their other end where a piston is disposed in said housing for progressively collapsing the package assemblies during its stroke, the contents of the package assemblies being discharged through their outlet end in their predetermined relative proportions.

Preferred embodiments of the device according to the invention as well as their advantages will become apparent from the following description and the drawings.

DETAILED DESCRIPTION OF THE INVENTION

Figure 1:
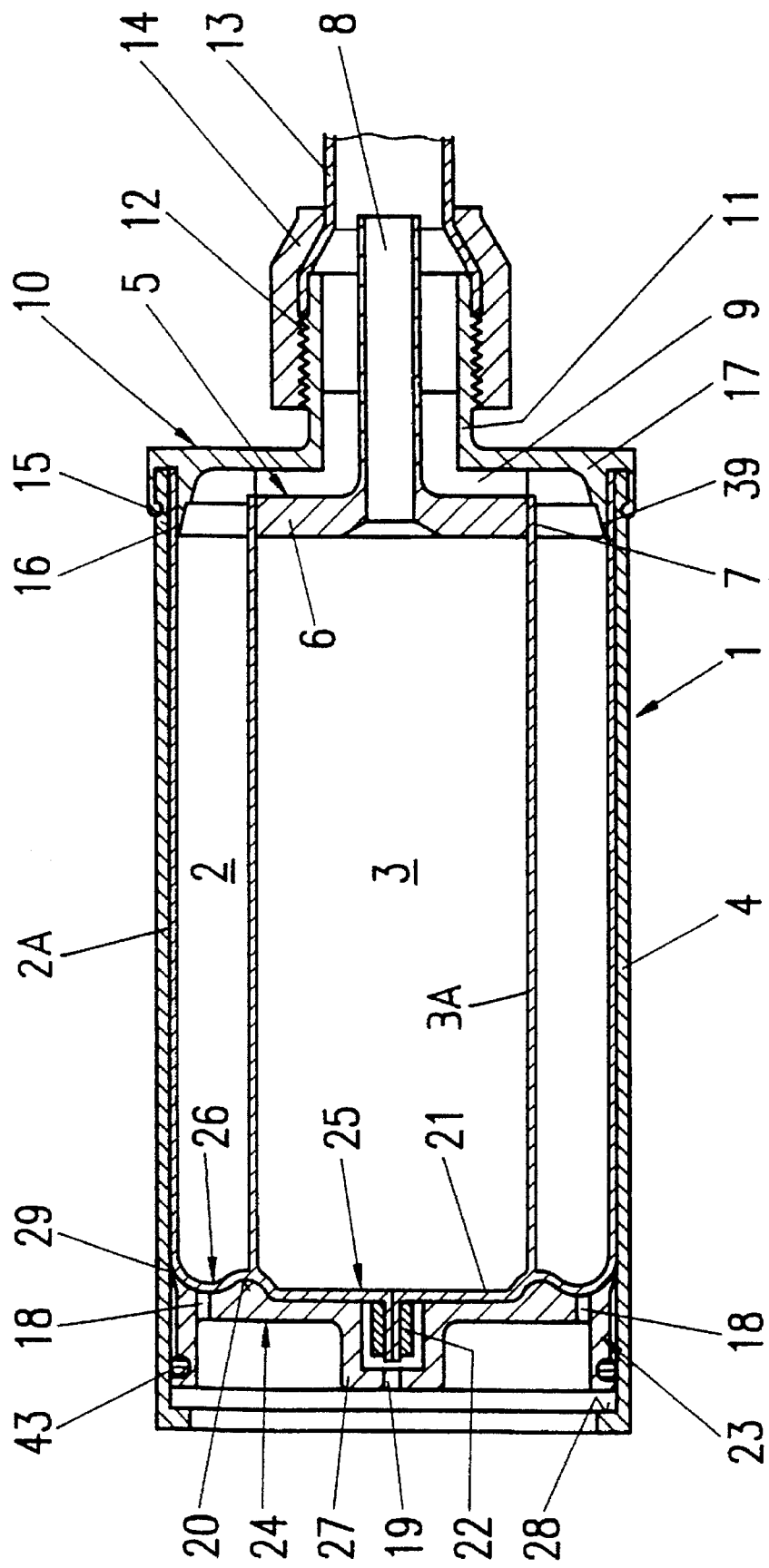
FIG. 1 shows a longitudinal sectional view of a first embodiment of a device according to the invention.

FIG. 1 shows a device comprising a coaxial two-component cartridge 1 having an outer package assembly 2 and an inner package assembly 3, contained in a reusable cylindrical rigid housing 4. The inner package tube 3A is secured at its outlet end by bonding, welding, or by mechanical means to an inner outlet piece 5. This inner outlet piece 5 comprises a disc-shaped holder 6 having a cylindrical outer surface 7 for fastening the package tube 3A, and an inner nozzle 8 comprising spacer ribs 9.

The outer package tube 2A is attached at its outlet end to a second outlet piece 10, comprising a common nozzle 11 having an outer thread 12 to which a mixing device 13, known per se, can be fastened by means of a retaining nut 14. This outlet piece 10 is removably attached to the rigid housing 4, for example by means of a snap-on device 15. The second outlet piece 10 also comprises a disc-shaped holder 17 having a cylindrical outer surface 16 for fastening the outer package tube 2A by the same techniques as those described for the inner package tube 3A. In order to avoid a separation of the outer package tube 2A from the inner surface of the housing 4 when a pressure is applied to the package assembly, the outer or second outlet piece 10 is provided with a sealing lip 39 for pressing the outer package tube 2A against the inner surface of the housing 4.

As it is shown in FIG. 1, the inner package assembly 3 with its inner outlet piece 10, is positioned by the ribs 9 and is inserted with its nozzle 8 into the common outlet nozzle 11, and the component material contained within the outer package assembly 2 is able to flow around the inner outlet nozzle 8 into the common nozzle 11 whereafter it is mixed in the mixing device 13 with the component material coming out of the inner package assembly 3.

The inner outlet nozzle 8 may be arranged coaxially to the corresponding outer elements, or it may have a rectangular, for example flat opening in order to give the outcoming material stream the shape of a ribbon across the diameter of the common nozzle 11.

The package assemblies 2 and 3 are sealed together at their other, closed end, these ends 20 and 21 being held together and in place by a common clamping means 22. The bottom of the common piston 23 has a rear surface 24 which is closed, and a shaped front side 25 facing and being in contact with the package assemblies 2 and 3. This front side 25 is shaped in a manner to be able to assist in the collapsing of the package assemblies against the piston. To this end, this front side 25 comprises an annular recess 26 for assisting in collapsing the outer package assembly 2 whereas the central portion of the piston is provided with a recess 27 for receiving the closed ends of the package assemblies and assisting in collapsing the inner package assembly 3. The piston is provided with a scraper lip 29 at its front surface 25 for peeling the outer package tube 2 off the wall of the housing 4 during its advancing movement. At its rear end, the piston 23 is provided with a sealing ring 43.

The piston 23 is driven by a plunger (not shown), known from other, similar devices, or directly by pneumatic pressure. It is to be mentioned that the rigid housing 4 has a shoulder 28 at its rear end (at the left in FIG. 1) to prevent the piston 23 from sliding out of the housing. During the insertion of the package assemblies 2 and 3, it is necessary for the air enclosed in the housing to escape. To this end, the piston has venting bores 18 in the region near to its periphery, namely in the proximity of the outer recess 26 and another venting bore 19 through the central recess 27.

Figure 2:
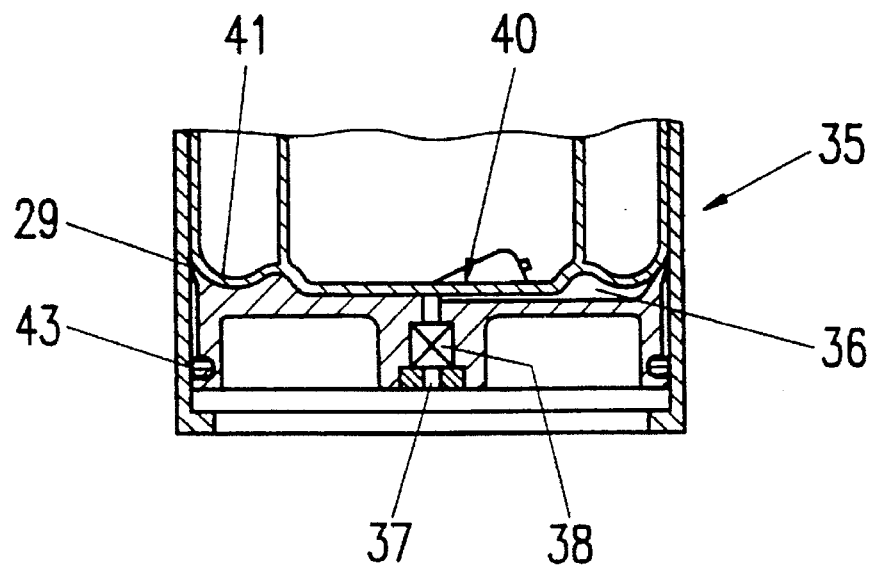
FIG. 2 shows an alternative detail of the device of FIG. 1.

FIG. 2 shows another, alternative piston 35 which is suitable for being directly driven pneumatically, i.e. by air pressure. Therefore, in this case, the piston must be closed, and the venting bores and grooves 36 are joined into the central bore 37 which contains a non-return valve 38 or the like, for example a closing valve, or the bore is closed by a closure plug (not shown). The central recess 40 is shaped for assisting in the collapsing of the inner package assembly 3 but not to receive the clamped ends of the package assemblies; in this embodiment, the clamped ends are folded sideways. The outer recess 41 and the lip 29 have the same functions as in the piston 23 of the first embodiment.

The package tubes 2A and 3A are made of a thin film, coated film, sheet or of a plastic/foil laminate, the materials being selected so as to make the package assemblies capable of being progressively collapsed and to be compressed to a minimal folded volume. It should be understood that other appropriate materials may also be used for the package assemblies as far as they are able to be collapsed and folded to a small volume and yet remain suitable to receive and store the materials to be dispensed. The rigid housing 4, which is more bulky and expensive, and the piston are re-usable whereas only the collapsed package assemblies including the outlet pieces will be disposed.

The rigid housing 4 may be shaped in such a manner that it may be an integral part of a dispensing device.

Figure 3:
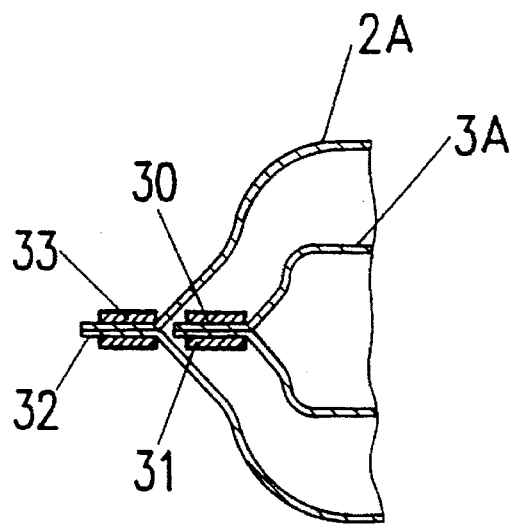
FIG. 3 shows a detail of the invention.

FIG. 3 shows a variant of the closed ends of the package assemblies 2 and 3. The end 30 of the inner package tube 3A is individually closed and sealed by a clamp 31 whereas the end 32 of the outer package tube 2A is closed and sealed by a second clamp 33.

Figure 4:
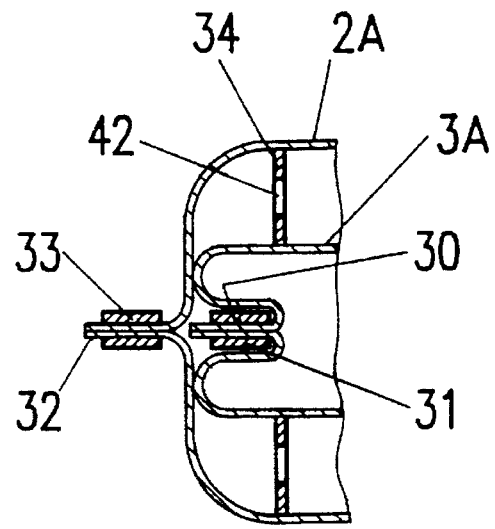
FIG. 4 shows a detail of an alternative of the device of FIG. 3.

FIG. 4 further shows an alternative to the embodiment of FIG. 3 in that the clamp 31 at the inner end of the inner package tube 3A has been pushed into the end of the package tube in order to minimize the space between the ends of the two package assemblies.

The invention has been illustrated by the description of a coaxial two-component system. However, it is well possible to apply the inventive concept described above to multiple component devices, for example those comprising three components and their corresponding package assemblies where two package assemblies are arranged within the third one which in turn is lodged within the rigid housing, all three package assemblies having individual outlets leading into a common outlet, and comprising one piston having the appropriate shape and number of recesses and bores for collapsing the package assemblies. In the case of more than one inner package assembly, the outlet nozzles of these inner package assemblies are advantageously aligned on a straight line going through the center of the common nozzle.

FIG. 4 further shows a perforated positioning plate 34 for positioning and holding in place the inner package assembly 3, that plate being particularly but not exclusively useful for more than one inner package assembly. To this end, the plate 34 is provided with openings 42 for receiving the ends of the corresponding inner package assemblies.

The above considerations apply to package assemblies having a ratio of their cross-sectional areas, corresponding to the metering ratio of the components contained in the package assemblies, of 1:1 or other ratios than 1:1, for example up to 1:10.

The design of the metering and relative proportioning device of the present invention should be such that the inner package assembly or package assemblies are not radially deformed during dispensing by the pressure applied to the outer package assembly and exerted on the inner package assembly or package assemblies. A correct operation requires the condition that in all embodiments, the cross-sectional areas of all package assemblies remain constant during dispensing.

Figure 5:
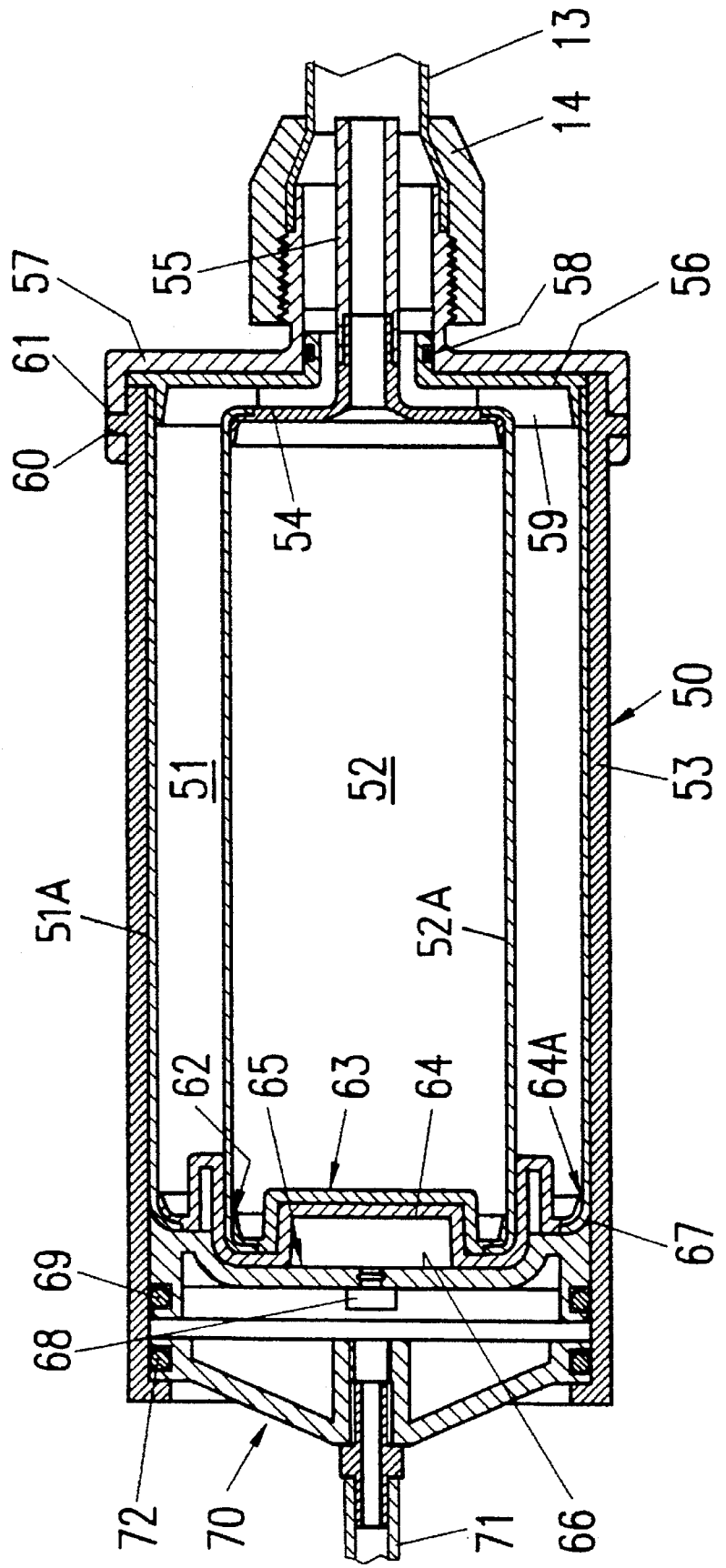
FIG. 5 shows a longitudinal sectional view of a second embodiment of a device according to the invention, with rear attachment so as to form a pneumatic dispenser.

FIG. 5 shows a sectional view of an improved, second embodiment of the invention, wherein also the front part of the cartridge is re-usable. FIG. 5 refers also to a coaxial two-component cartridge 50 having an outer package assembly 51 and a inner package assembly 52, contained in a cylindrical rigid housing 53. In these embodiments both package tubes are fastened individually to the outlet pieces and to the rear pieces.

The inner package tube 52A is secured at its outlet end by bonding or other already disclosed means to a circular outlet piece 54 ending in an inner nozzle 55 of the common nozzle of the re-usable cartridge front piece 57, on which in turn the mixing device 13 can be fastened. The outer package tube 51A is secured at its outlet end to a circular second outlet piece 56, which as opposed to the previous embodiment, is independent from the cartridge front piece 57, and is therefore re-usable. The second outlet piece 56 is insertable into the common outlet of cartridge front piece 57 and sealed by sealing means 58 and further comprises ribs 59 for centering and holding in place the inner package assembly 52.

Front piece 57 is connected by a bayonet or thread joint 60, 61 to the housing 53, whereby a key and mating slot arrangement between the outlet piece 56 and the housing 53 prevents the package assemblies from being twisted when attaching the cartridge front piece.

At the inlet end the package tubes 51A and 52A are fastened individually to rear pieces. Inner package tube 52A is fastened by aforementioned means to the outer rim 62 of a circular inner rear piece 63 which front matches the shape of the inner outlet piece 54, allowing a ring-shaped space for the collapsed inner package assembly 52 and which piece is inserted in an outer rear piece 64, to which outer rim 64A the outer package tube 51A is attached to.

This construction with two individual rear pieces enables the re-use of the piston 65 having a front face 66 following the shape of the rear face of the outer rear piece 64, and a scraper lip 67 for peeling the outer package tube 51A from the wall of the housing 53. The piston 65 is further provided with a venting means 68 at its bottom, and a sealing ring 69.

Figure 6:
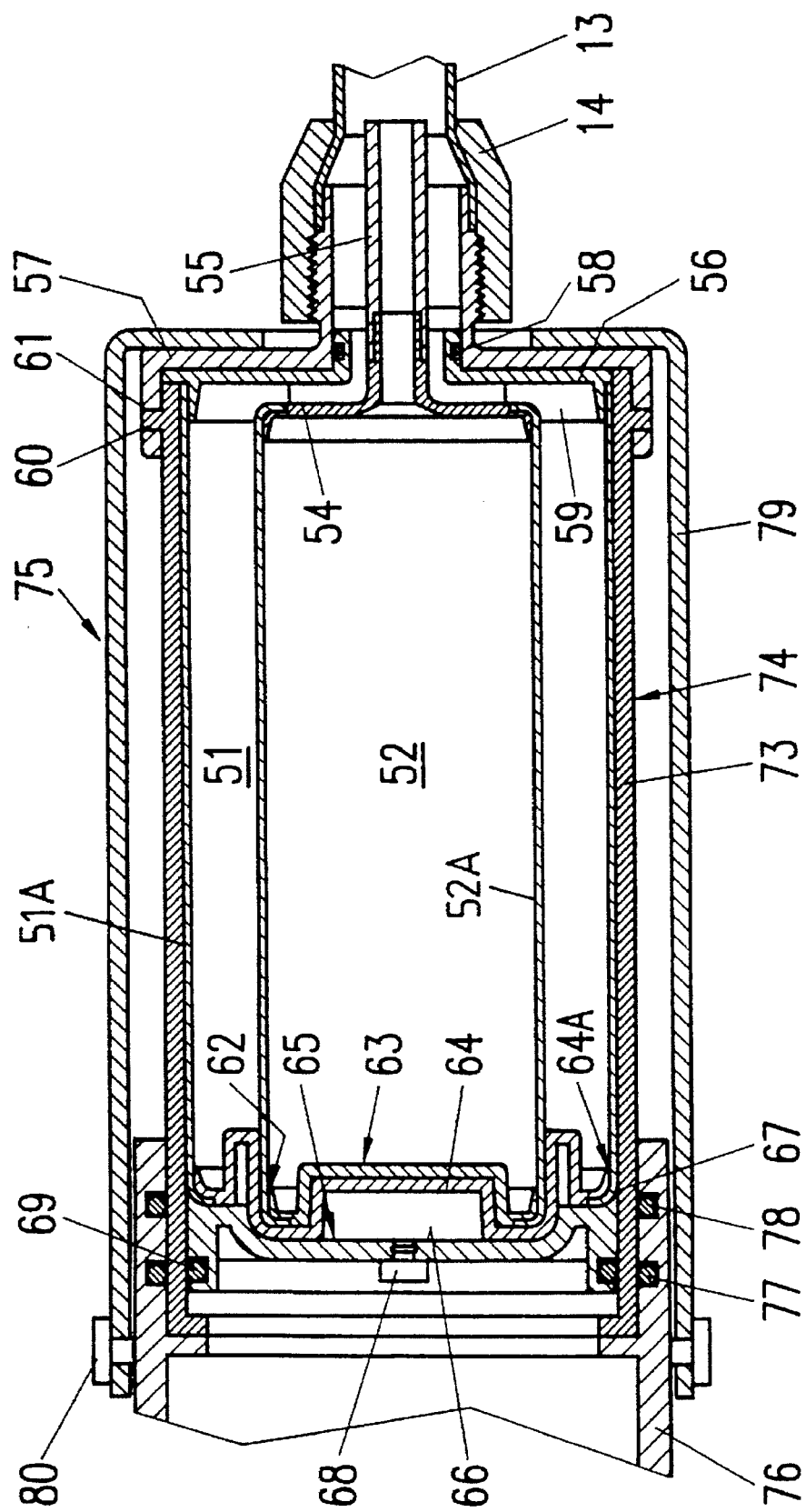
FIG. 6 shows the device of FIG. 5 disposed within the front part of a dispenser.

There are different ways to propell the sealed piston down the cylinder housing and FIGS. 5 and 6 show two examples thereof. In the example of FIG. 5 is shown a sealed air flow connection device 70 with a sealing ring 72 and a connection 71 leading to an on/off air valve (not shown). It will be appreciated that this construction requires no separate air cylinder/plunger dispensing devices.

FIG. 6 shows the almost identical device 74 of FIG. 5 with the exception that the housing 73 does not receive an air flow connection device. As a variant to FIG. 5 the device 74 is actioned by a dispenser 75. To this end cartridge assembly 74 is placed into the dispensing end of a receiving tube 76 of the dispenser which is provided with one or two sealing rings 77, 78. The whole cartridge assembly is restrained by a cradle 79 swivelling around axle 80.

Figure 7:
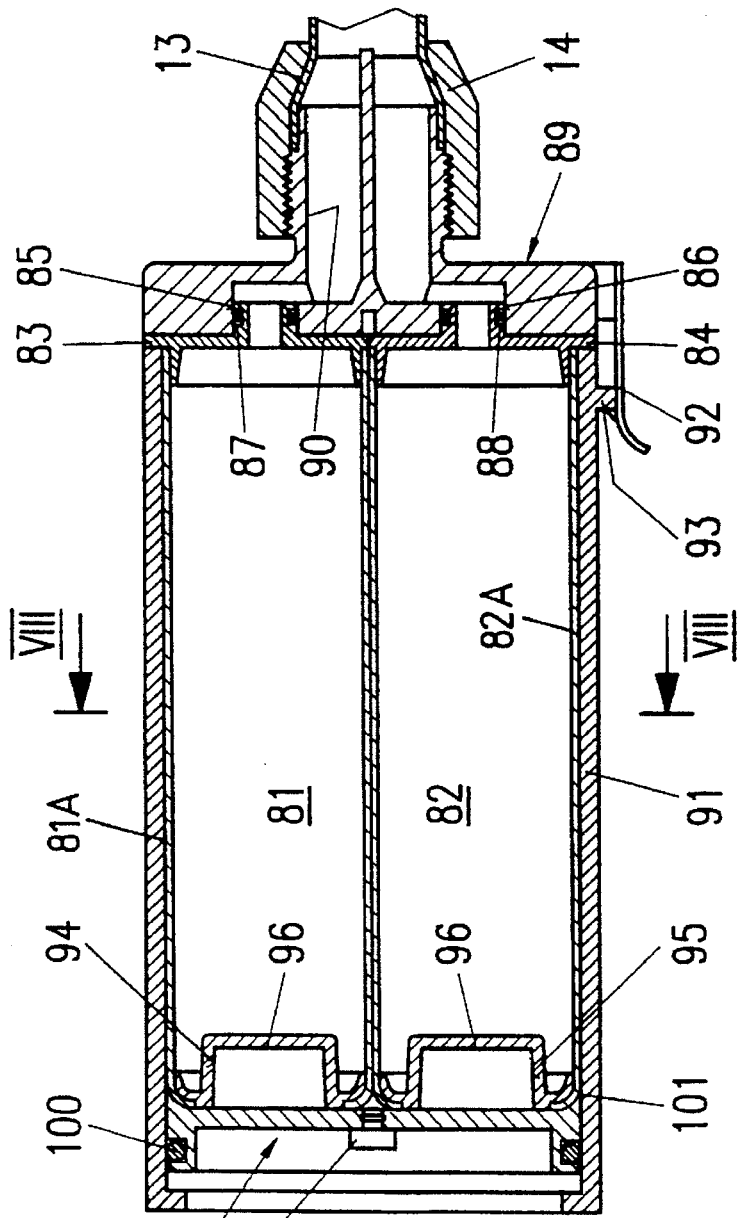
FIG. 7 shows a longitudinal sectional view of a third embodiment of a device according to the invention.

FIG. 7 shows a third embodiment of the invention wherein the two package assemblies are arranged side-by-side, whereas the principle to empty the package assemblies by one piston and to re-use the cartridge front piece, the cylindrical cartridge housing as well as the piston is maintained.

Each package tube 81A, 82A is fastened at its outlet end to a D-shaped outlet piece 83, 84 which nozzle 85, 86 having each a sealing ring 87, 88 is inserted into a corresponding opening in a cartridge front piece 89 having a common nozzle 90 for connection to the mixing device 13. In this particular embodiment the cartridge front piece is fastened to the cylindrical housing 91 by a spring clip 92 reaching behind a projection 93 at housing 91.

At the inlet end each package assembly is fastened to the outer rim of a rear piece 94, 95, which front part 96 is adapted to the shape of the outlet piece 83, 84, so as to allow space for the collapsed package assembly 81 or 82 and to minimize residue. The rear pieces and with it the rear of the package assemblies are driven by a common piston 97 being provided with a venting means 98, a sealing ring 100, and a scraping lip 101. It is evident that the piston can be driven according to FIG. 5 or according to FIG. 6, or by any other appropriate device.

Figure 8:
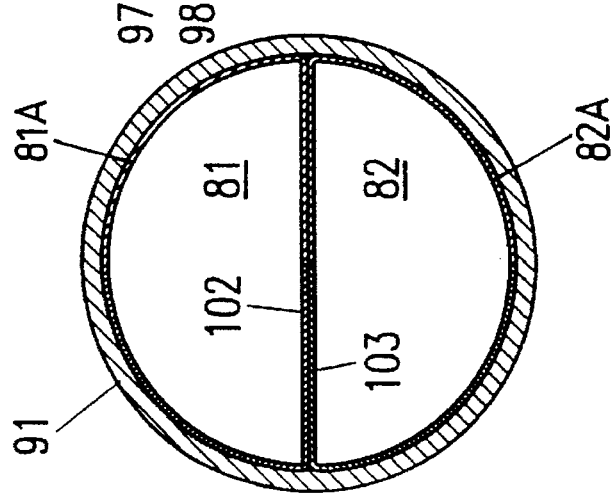
FIG. 8 shows a sectional view of the device along the line VIII—VIII of FIG. 7, and FIGS. 9 and 10 show in a sectional view two alternatives of the embodiment of FIG. 7.
Figure 9:
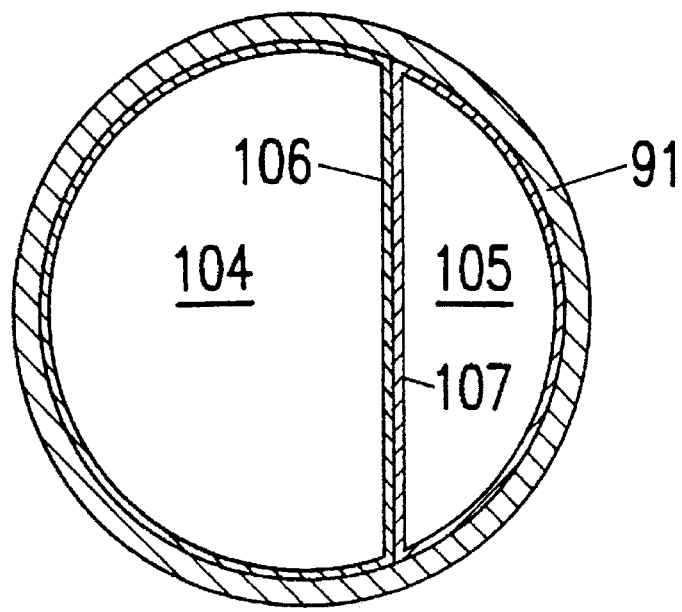
Figure 10:
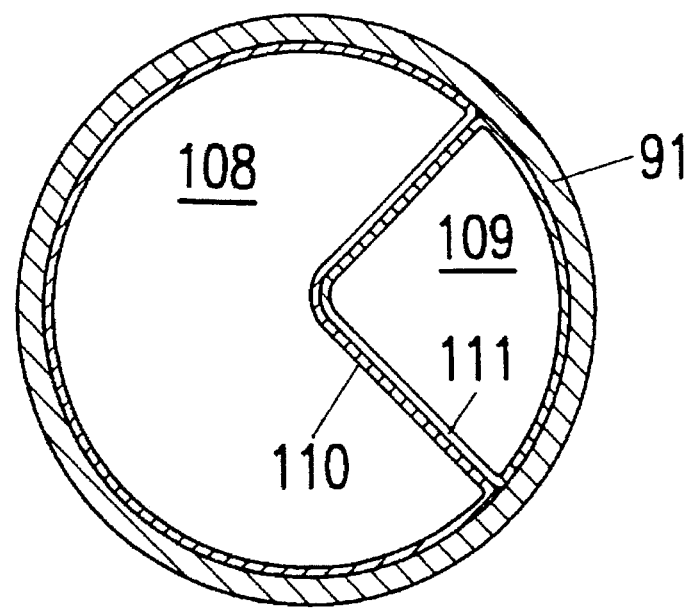

In FIG. 8 it is shown that the two package assemblies have the identical shapes with a cross-sectional area of a semicircle, its two flat sides 102, 103 being pressed against each other. FIGS. 9 and 10 show that neither the shape nor the cross-sectional dimension of the package assemblies need be identical or equal, while the housing 91 remains cylindrical. In FIG. 9 the cross-sectional area of package assembly 104 is greater than a semicircle and the cross-sectional area of package assembly 105 is accordingly smaller, both package assemblies having a flat side to 106 and 107, respectively, which are pressed against each other, whereas in FIG. 10 the package assemblies 108 and 109 have different cross-sectional areas and sector-like sides to 110 and 111, respectively, which are pressed against each other, demonstrating that numerous shapes are possible. The material and construction of the package assemblies is the same as previously disclosed.

I claim:

1. A multiple component metering and relative proportioning device, comprising a collapsible cartridge, a first receptacle containing a first component, and a second receptacle containing a second component, wherein the receptacles are package assemblies which are collapsible and located in a housing, each package assembly comprising a package tube and having an individual outlet at an outlet end, all individual outlets being joined in a common cartridge front piece, the package assemblies being sealed at an inlet end where a piston is disposed in the housing for progressively collapsing the package assemblies during a stroke of the piston, the contents of the package assemblies being discharged through the outlets in predetermined relative proportions; and wherein a sealing means is provided for pressing a front edge of at least one of said package tubes against the housing.

2. A device according to claim 1, wherein the common cartridge front piece is removably fastened to said housing.

3. A device according to claim 1, wherein each package tube is fastened individually at its outlet end to an outlet piece and at its inlet end to a rear piece.

4. A device according to claim 1, wherein said sealing means comprises a sealing lip formed on the common front piece.

5. A device according to claim 1, wherein the common front piece comprises means for fastening a mixing nozzle.

6. A device according to claim 1, wherein the piston comprises a means for assisting in the collapsing of the package assemblies and comprises at its front side a lip for peeling the package tube off an inner wall of the housing.

7. A device according to 1, wherein the piston comprises venting means through its bottom for allowing air enclosed in the housing to escape.

8. A device according to claim 1, wherein the collapsible package tubes are made of an appropriate plastic film or plastic/foil laminate, and the outlet pieces are disposable whereas the housing and the piston are re-usable.

9. A device according to claim 1, wherein the collapsible package tubes are made of an appropriate plastic film or a plastic/foil laminate, and the outlet pieces and the rear pieces are disposable, whereas the cartridge front piece, the housing and the piston are re-usable.

10. A device according to claim 1, wherein the inlet ends of the package assemblies are sealed individually or jointly.

11. A device according to claim 1, wherein the package tubes are attached to corresponding surfaces of the common cartridge front piece by bonding, welding, or by mechanical means.

12. A device according to claim 1, wherein a ratio of cross-sectional areas of individual components within the package assemblies is between 1:1 and 1:10.

13. A device according to claim 1, wherein said one receptacle is mounted coaxially within said second receptacle, and wherein an inner outlet nozzle is disposed within a common nozzle of the cartridge front piece.

14. A device according to claim 13, wherein the inner outlet nozzle is aligned on a straight line going through the center of the common nozzle.

15. A device according to claim 13, wherein the inner nozzle comprises a rectangularly shaped opening end in order to give the inner component material stream the shape of a ribbon across the diameter of the common nozzle.

16. A device according to claim 1, wherein the piston is propelled by pressurized air via a sealed air flow connection device.

17. A device according to claim 1, wherein said first and second receptacles are mounted side-by-side, and wherein outlet nozzles of the individual outlets lead into a common nozzle of the cartridge front piece.

18. A device according to claim 17, wherein the package assemblies are identical and have a D-shaped cross-sectional area with two flat sides, the two flat sides being pressed against each other.

19. A device according to claim 17, wherein the package assemblies have respective different cross-sectional areas, and flat or angled sides which are pressed against each other.

20. A device according to claim 1, wherein said first receptacle is located coaxially within said second receptacle, and said sealing means comprises a sealing lip formed on the common front piece for pressing the package tube of said second receptacle against the housing.

21. A device according to claim 1, wherein said first receptacle and said second receptacle are located side-by-side, and said sealing means comprises a sealing lip formed on respective first and second outlet pieces.

22. A multiple component metering and relative proportioning device, comprising a collapsible cartridge, a first receptacle containing a first component, and a second receptacle containing a second component, wherein the receptacles are package assemblies which are collapsible and located in a housing, each package assembly comprising a package tube and having an individual outlet at an outlet end, all individual outlets being joined in a common cartridge front piece, the package assemblies being sealed at an inlet end where a piston is disposed in the housing for progressively collapsing the package assemblies during a stroke of the piston, the contents of the package assemblies being discharged through the outlets in predetermined relative proportions;

wherein the piston comprises venting means through its bottom for allowing air enclosed in the housing to escape; and wherein the piston comprises venting grooves ending in a central bore in the bottom of the piston, said central bore comprising one of a non-return valve, a closing valve, or a plug.

23. A device according to claim 22, wherein said first receptacle is located coaxially within said second receptacle.

24. A device according to claim 22, wherein said first receptacle and said second receptacle are located side-by-side in said housing.

25. A multiple component metering and relative proportioning device, comprising a collapsible cartridge, wherein at least one receptacle containing one component is located within a second receptacle containing another component, wherein the receptacles are package assemblies which are collapsible and located in a housing, each package assembly comprising a package tube and having an individual outlet at an outlet end, all individual outlets being joined in a common cartridge front piece, the package assemblies being sealed at an inlet end where a piston is disposed in the housing for progressively collapsing the package assemblies during a stroke of the piston, the contents of the package assemblies being discharged through the outlets in predetermined relative proportions;

wherein the sealed inlet ends of the package assemblies are held and positioned by a positioning plate comprising openings.

* * * * *